US012046197B2

(12) United States Patent
Lee et al.

(10) Patent No.: US 12,046,197 B2
(45) Date of Patent: Jul. 23, 2024

(54) IMAGE DATA PROCESSING APPARATUS AND METHOD FOR DRIVING DISPLAY PANEL

(71) Applicant: LX Semicon Co., Ltd., Daejeon (KR)

(72) Inventors: Ji Won Lee, Daejeon (KR); Ji Hong Yuk, Daejeon (KR); Sa Ra Yoon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/824,573

(22) Filed: May 25, 2022

(65) Prior Publication Data

US 2022/0383805 A1 Dec. 1, 2022

(30) Foreign Application Priority Data

May 26, 2021 (KR) ........................ 10-2021-0067707
Mar. 25, 2022 (KR) ........................ 10-2022-0037394

(51) Int. Cl.
*G09G 3/3233* (2016.01)

(52) U.S. Cl.
CPC ... *G09G 3/3233* (2013.01); *G09G 2320/0233* (2013.01); *G09G 2320/0257* (2013.01); *G09G 2320/04* (2013.01); *G09G 2320/0626* (2013.01); *G09G 2330/021* (2013.01); *G09G 2340/0435* (2013.01); *G09G 2340/16* (2013.01)

(58) Field of Classification Search
CPC ......... G09G 3/3233; G09G 2320/0233; G09G 2320/0257; G09G 2320/04; G09G 2320/0626; G09G 2330/021; G09G 2340/0435; G09G 2340/016
See application file for complete search history.

(56) References Cited

U.S. PATENT DOCUMENTS

| | | | | |
|---|---|---|---|---|
| 10,083,498 | B2 | 9/2018 | Chang et al. | |
| 10,657,874 | B2 * | 5/2020 | Tang | G09G 3/2003 |
| 10,706,817 | B2 * | 7/2020 | Tang | G09G 3/2007 |
| 10,957,236 | B2 * | 3/2021 | Liao | G09G 3/2003 |
| 2018/0137807 | A1 * | 5/2018 | Cheng | G09G 3/30 |
| 2019/0122636 | A1 * | 4/2019 | Tang | G09G 5/10 |
| 2020/0342801 | A1 * | 10/2020 | Liao | G09G 3/2003 |
| 2022/0157257 | A1 * | 5/2022 | Kim | G09G 3/3275 |

* cited by examiner

*Primary Examiner* — Gene W Lee
(74) *Attorney, Agent, or Firm* — POLSINELLI PC

(57) ABSTRACT

The present embodiment provides an image data processing apparatus, including a memory storing previous frame image data and an image data compensating circuit configured to generate overdriving image data for current frame image data by comparing the previous frame image data and the current frame image data, wherein the degree of an overdriving is adjusted based on a display brightness value (DBV), which is used for adjusting the brightness of a display panel.

19 Claims, 11 Drawing Sheets

IMAGE DATA PROCESSING APPARATUS AND METHOD FOR DRIVING DISPLAY PANEL

CROSS REFERENCE TO RELATED APPLICATION

This application claims priority from Republic of Korea Patent Applications Nos. 10-2021-0067707 filed on May 26, 2021 and 10-2022-0037394 filed on Mar. 25, 2022, which are hereby incorporated by reference in their entireties.

BACKGROUND

1. Field of Technology

The present embodiment relates to a technology for processing image data for driving a display panel.

2. Description of the Prior Art

A display apparatus may include a display panel and driving devices.

Multiple pixels may be disposed in the display panel. Furthermore, each pixel may include a plurality of subpixels. The subpixels may be a red (R) pixel, a green (G) pixel, and a blue (B) pixel, for example.

The luminance of each subpixel may be determined by driving power supplied to each subpixel. Furthermore, the size of the driving power may be controlled by an image data driving apparatus that supplies a data voltage to each subpixel. The image data driving apparatus may generate a data voltage based on a grayscale value of each subpixel, and may control the size of driving power for each subpixel by supplying the data voltage to each subpixel.

The image data driving apparatus may extract a grayscale value of each subpixel from image data. The image data driving apparatus may receive the image data from an image data processing apparatus. Such image data may include a grayscale value of each subpixel.

The image data processing apparatus may receive image data from an external apparatus, such as a host, and may process the image data so that the image data is suitable for driving a display panel. Furthermore, the image data processing apparatus may transmit the processed image data to the image data driving apparatus. The image data processing apparatus may perform digital gamma conversion on image data received from an external apparatus, for example, and may transmit the digital-gamma-converted image data to the image data driving apparatus.

The image data driving apparatus is also called a source driver. Furthermore, the image data processing apparatus is also called a timing controller.

Meanwhile, the first image data received from the external apparatus may include a target grayscale value corresponding to the target luminance of each subpixel. However, when each subpixel is driven at the target grayscale value, the actual luminance of each subpixel may be different from the target luminance. When the actual luminance of each subpixel and the target luminance of each subpixel are different from each other, users of a display panel may recognize the deterioration of picture quality. For example, users may recognize a motion blur phenomenon, recognize an image sticking phenomenon, or recognize a frame drop phenomenon in the display panel.

SUMMARY OF THE INVENTION

In such a background, an embodiment of the present embodiment is to provide a technology for driving a display panel, which can improve picture quality.

In an aspect, the present embodiment provides an image data processing apparatus, including a memory to store previous frame image data and an image data compensating circuit configured to generate overdriving image data for current frame image data by comparing the previous frame image data and the current frame image data, wherein the degree of an overdriving is adjusted based on a display brightness value (DBV), which is used for adjusting the brightness of a display panel.

In another aspect, the present embodiment provides an image data processing apparatus, including a memory to store previous frame image data and an image data compensating circuit configured to generate overdriving image data for current frame image data by comparing the previous frame image data and the current frame image data, wherein the degree of an overdriving is adjusted based on a driving variable for each subpixel.

In still another aspect, the present embodiment provides an image data processing method, including receiving current frame image data and storing the current frame image data in a memory, checking a value of a driving variable for driving a display panel and determining an overdriving lookup table based on the value of the driving variable, determining an overdriving value for the current frame image data by applying, to the overdriving lookup table, previous frame image data and the current frame image data stored in the memory, and compensating for the current frame image data by using the overdriving value.

As described above, according to the present embodiment, picture quality can be improved through the processing of image data.

DETAILED DESCRIPTION OF THE EXEMPLARY EMBODIMENTS

Figure 1:
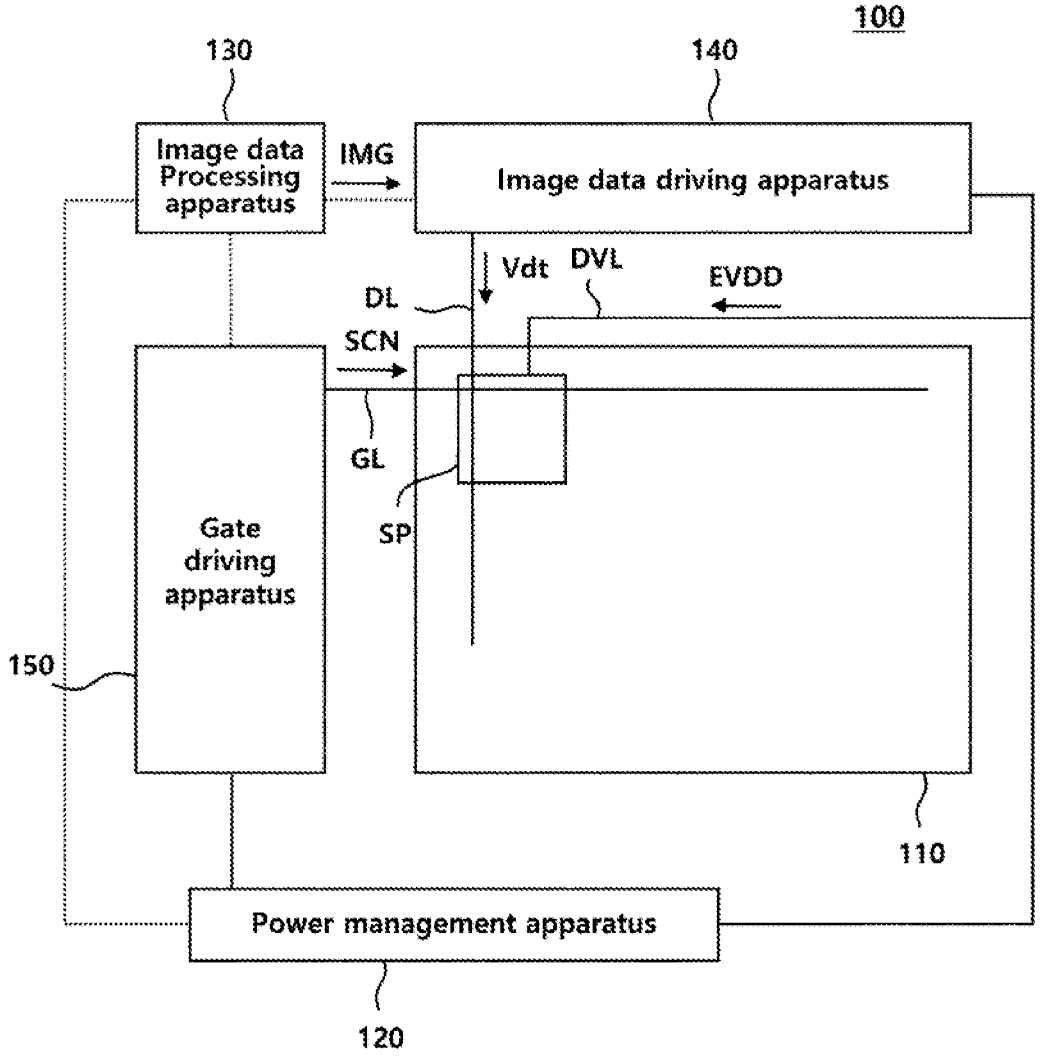
FIG. 1 is a configuration diagram of a display apparatus according to an embodiment.

FIG. 1 is a configuration diagram of a display apparatus according to an embodiment.

Referring to FIG. 1, a display apparatus 100 may include a display panel 110, a power management apparatus 120, an image data processing apparatus 130, an image data driving apparatus 140, and a gate driving apparatus 150.

The display panel 110 is an apparatus for displaying an image. Multiple subpixels SP may be disposed in the display panel 110. An image may be displayed on the display panel 110 based on the brightness of each subpixel SP.

A plurality of subpixels SP may form one pixel. One pixel may represent a color by using a plurality of subpixels SP. The subpixel SP may be a red (R) pixel, a green (G) pixel, and a blue (B) pixel, for example.

The display panel 110 may be a panel including a self-light emitting element. For example, the display panel 110 may be an organic light-emitting diode (OLED) panel or a micro light-emitting diode panel. A self-light emitting element may be disposed in each subpixel SP of the display panel 110. Furthermore, the luminance of each subpixel SP may be determined by the amount of emission of the self-light emitting element. An example in which the self-light emitting element is an OLED is basically described. However, the present embodiment is not limited to such an example.

The image data processing apparatus 130 may process image data IMG.

The image data IMG may include a grayscale value of each subpixel SP. The image data processing apparatus 130 may process such grayscale values in a way to be suitable for the display panel 110.

For example, the image data processing apparatus 130 may perform digital gamma conversion on the image data IMG. A person may be sensitive to a low grayscale, and may be insensitive to a high grayscale. Accordingly, the image data processing apparatus 130 may increase grayscale resolution having a low grayscale and decrease grayscale resolution having a high grayscale through digital gamma conversion for the image data IMG.

Furthermore, for example, the image data processing apparatus 130 may perform encoding processing for randomly mixing bits of the image data in order to generate the occurrence of electro-magnetic interference (EMI).

Furthermore, for example, the image data processing apparatus 130 may perform processing for correcting the image data IMG so that a difference between the actual luminance and the target luminance in the display panel 110 is minimized. For example, the image data processing apparatus 130 may make the actual luminance identical with or similar to the target luminance by modifying a grayscale value of image data received from an external apparatus in a way to be higher or lower.

The image data processing apparatus 130 according to an embodiment may correct the image data IMG by applying an overdriving scheme. The overdriving scheme may be a method of driving a subpixel at a grayscale value higher than a target grayscale value or a grayscale value lower than the target grayscale value. For example, according to the overdriving scheme, the overdriving scheme may drive one subpixel SP at a grayscale value higher than a current frame grayscale value when the current frame grayscale value is higher than a grayscale value of a previous frame, and may drive the one subpixel SP at a grayscale value lower than the current frame grayscale value when the current frame grayscale value is lower than the grayscale value of the previous frame.

After correcting the image data IMG as in the aforementioned example, the image data processing apparatus 130 may transmit the corrected image data to the image data driving apparatus 140.

The image data driving apparatus 140 may receive the image data IMG, may generate a data voltage Vdt based on a grayscale value of each subpixel SP included in the image data IMG, and may supply the data voltage Vdt to each subpixel SP.

The image data driving apparatus 140 may supply the data voltage Vdt through a data line DL that is connected to each subpixel SP. Multiple subpixels may be connected to one data line DL. The data voltage Vdt supplied by the image data driving apparatus 140 may be supplied to only one subpixel SP that is selected by a scan signal SCN. The scan signal SCN may be supplied by the gate driving apparatus 150 through a gate line GL.

Since multiple subpixels SP are connected to one data line DL, a driving characteristic of each subpixel SP may be different depending on a location where the multiple subpixels SP are connected to the data line DL. For example, a subpixel SP close to the image data driving apparatus 140 may be less influenced by line impedance that is formed in the data line DL than a subpixel SP distant from the image data driving apparatus 140. Each subpixel SP may be influenced by RC delay depending on line impedance that is formed in the data line DL. A subpixel SP close to the image data driving apparatus 140 may be relatively less influenced by RC delay.

The image data processing apparatus 130 may perform correction processing on the image data IMG in order to compensate for a deviation between driving characteristics of subpixels according to a location of each subpixel SP. For example, the image data processing apparatus may adjust an overdriving value to be high as each subpixel SP becomes distant from the image data driving apparatus 140, and may adjust an overdriving value to be low as each subpixel SP becomes close to the image data driving apparatus 140. In this case, being distant and close may be determined by the length of a wire of the data line DL that is connected from the image data driving apparatus 140 to each subpixel SP.

A self-light emitting element, for example, an OLED, may be disposed in each subpixel SP. Driving power for the self-light emitting element may be supplied by the power management apparatus 120. Furthermore, a driving characteristic of each subpixel SP may be different depending on a distance from the power management apparatus 120. For example, a subpixel SP close to the power management apparatus 120 may be less influenced by line impedance that is formed in a driving voltage line DVL than a subpixel SP distant from the power management apparatus 120.

The power management apparatus 120 supplies driving power to each subpixel SP through the driving voltage line DVL. The influence of line impedance may be greater as the length of the driving voltage line DVL from the power management apparatus 120 to each subpixel SP is increased.

The power management apparatus 120 may supply a driving voltage EVDD through the driving voltage line DVL. A driving transistor may be disposed in each subpixel SP. The driving voltage EVDD may be supplied to a drain electrode of the driving transistor. Furthermore, the image data driving apparatus 140 may supply the data voltage Vdt to a data electrode of the driving transistor. A gate-source voltage of the driving transistor may be determined by the data voltage Vdt. The size of a driving current that flows into the driving transistor may be determined by the gate-source voltage and the driving voltage EVDD.

Line impedance formed in the data line DL may affect the gate-source voltage. Line impedance formed in the driving voltage line DVL may affect the driving voltage EVDD supplied to the drain electrode. The image data processing apparatus 130 may correct the image data IMG in order to compensate for a deviation between driving characteristics of subpixels according to a location of each subpixel SP, and transmit the corrected image data IMG.

In order to describe a driving characteristic of a subpixel including a self-light emitting element, a circuit configuration diagram of the subpixel is more specifically described.

Figure 2:
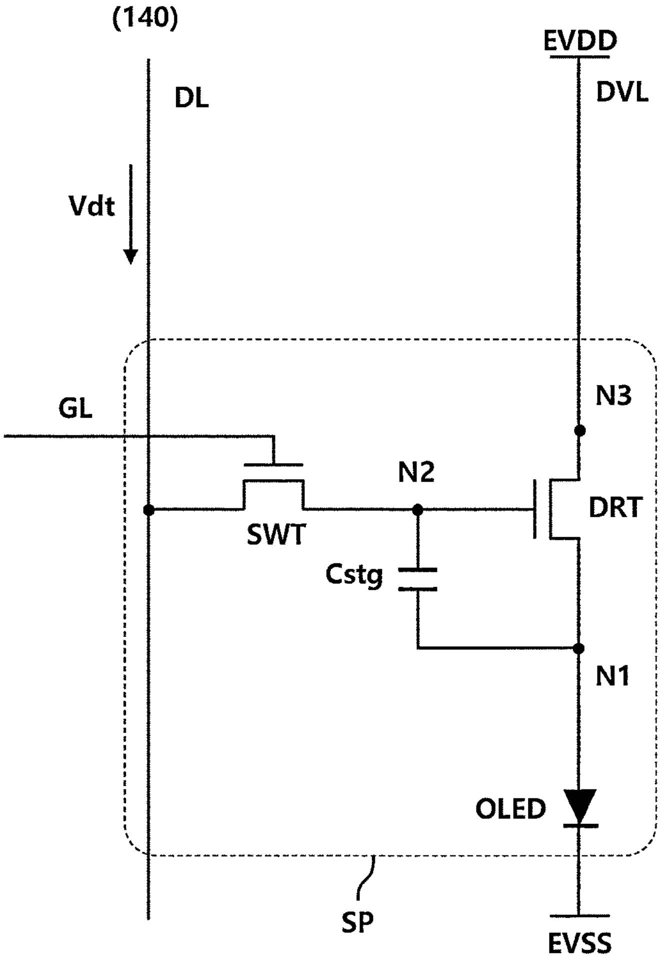
FIG. 2 is a circuit configuration diagram of a subpixel according to an embodiment.

FIG. 2 is a circuit configuration diagram of a subpixel according to an embodiment.

Referring to FIG. 2, the subpixel SP may include an OLED, a driving transistor DRT, a switching transistor SWT, a storage capacitor Cstg, etc.

The OLED may include an anode electrode, an organic layer, and a cathode electrode. The anode electrode is connected to the driving voltage EVDD and emits light, and the cathode electrode is connected to a base voltage EVSS and emits light, under the control of the driving transistor DRT.

The driving transistor DRT may control the luminance of the OLED by controlling a driving current supplied to the OLED.

A first node N1 of the driving transistor DRT may be electrically connected to an anode electrode of the OLED, and may be a source node or a drain node. A second node N2 of the driving transistor DRT may be electrically connected to a source node or drain node of the switching transistor SWT, and may be a gate node. A third node N3 of the driving transistor DRT may be electrically connected to the driving voltage line DVL that supplies the driving voltage EVDD, and may be a drain node or a source node.

The switching transistor SWT may be electrically connected between the data line DL and the second node N2 of the driving transistor DRT, and may be turned on by being supplied with a scan signal through the gate line GL.

When the switching transistor SWT is turned on, the data voltage Vdt supplied by the image data driving apparatus 140 through the data line DL is delivered to the second node N2 of the driving transistor DRT.

The storage capacitor Cstg may be electrically connected between the first node N1 and second node N2 of the driving transistor DRT.

The storage capacitor Cstg may be a parasitic capacitor present between the first node N1 and second node N2 of the driving transistor DRT or may be an external capacitor that is intentionally designed outside the driving transistor DRT.

When the data voltage Vdt is supplied to the second node N2, a gate-source voltage Vgs may be formed between the second node N2 and the first node N1. The size of a driving current that passes through the driving transistor DRT may be determined by the gate-source voltage. Since the storage capacitor Cstg is disposed between the second node N2 and the first node N1, the gate-source voltage can be constantly maintained although the supply of a scan signal is stopped and the switching transistor SWT is turned off. Furthermore, a driving current that flows from the driving voltage line DVL to the OLED can also be constantly maintained by the gate-source voltage.

Line impedance may be present in the data line DL and the driving voltage line DVL. For example, line resistance and line capacitance may be formed in the data line DL and the driving voltage line DVL. Such line resistance and line capacitance may cause RC delay in the data voltage Vdt and the driving voltage EVDD.

The storage capacitor Cstg is disposed between the first node N1 and second node N2 of the driving transistor DRT. The storage capacitor Cstg plays the role of constantly maintaining the gate-source voltage Vgs of the driving transistor DRT, but may become a factor that hinders a change in the data voltage Vdt. For example, the storage capacitor Cstg may become a factor that increases RC delay along with line impedance of the data line DL.

A characteristic of the driving transistor DRT that causes RC delay is also called a hysteresis characteristic or a response characteristic. The line impedance of the data line DL and the driving voltage line DVL and the hysteresis characteristic or response characteristic of the driving transistor DRT become a factor that the luminance of the subpixel SP becomes different from the target luminance.

Figure 3:
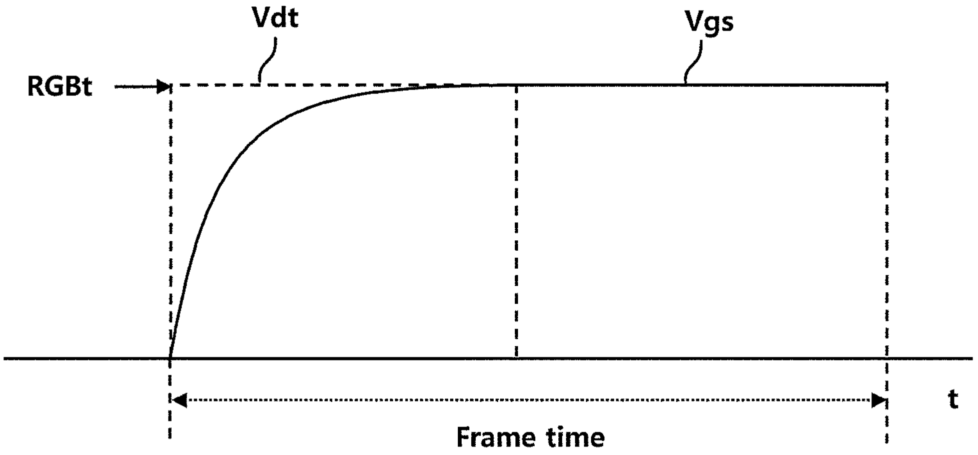
FIG. 3 is a diagram illustrating a waveform of an example of a data voltage and a gate-source voltage of a driving transistor.

FIG. 3 is a diagram illustrating a waveform of an example of the data voltage and the gate-source voltage of the driving transistor.

Referring to FIG. 3, it may be seen that given time delay occurs until the gate-source voltage Vgs follows the data voltage Vdt after the data voltage Vdt is supplied. The time delay may be caused by line impedance of the data line and the driving voltage line described with reference to FIG. 2 or may be caused by the hysteresis characteristic or response characteristic of the driving transistor.

When the time delay occurs, a user may recognize a given difference between the actual luminance and the target luminance RGBt because the luminance of a subpixel is less than the target luminance RGBt in some of a frame time.

In order to solve such a difference, the image data driving apparatus according to an embodiment may overdrive each subpixel.

Figure 4:
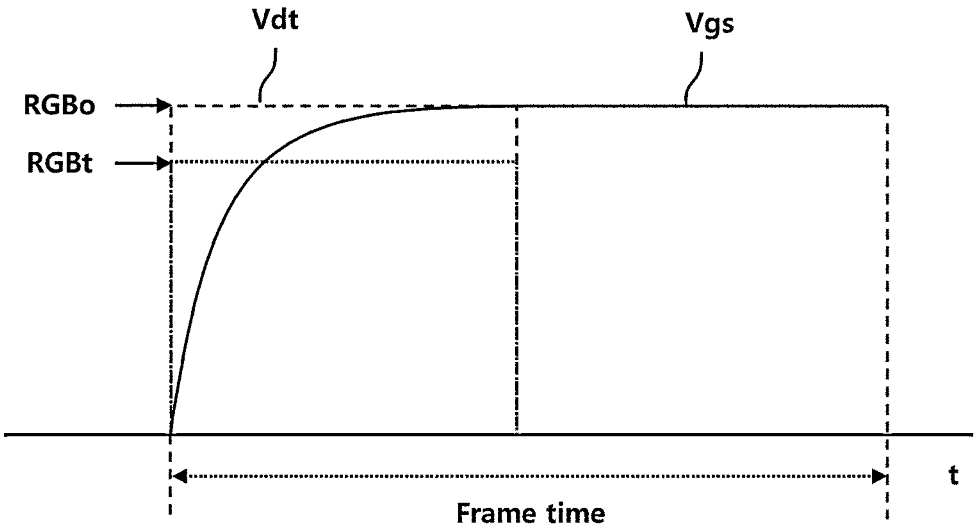
FIG. 4 is a diagram illustrating waveforms of an example of a data voltage and a gate-source voltage of the driving transistor according to overdriving.

FIG. 4 is a diagram illustrating waveforms of an example of the data voltage and the gate-source voltage of the driving transistor according to overdriving.

Referring to FIG. 4, the image data driving apparatus may supply a subpixel with the data voltage Vdt corresponding to luminance RGBo that is higher than target luminance RGBt. Even in this case, likewise, a time delay may occur in the data voltage Vdt. A reduction in luminance attributable to the time delay may be offset by setting the data voltage Vdt to be high.

Accordingly, the actual luminance of the subpixel, for example, the average luminance during one frame time may become equal to the target luminance or may approach within an error range from the target luminance.

Overdriving for reducing a difference between the actual luminance and the target luminance may be implemented by the image data driving apparatus or may be implemented by the image data processing apparatus. For example, the image data driving apparatus may implement the overdriving in a way to compare a previous frame grayscale value and current frame grayscale value of each subpixel and to increase or decrease the data voltage Vdt in accordance with a difference between the two grayscale values. Furthermore, for example, the image data processing apparatus may implement the overdriving in a way to modify a grayscale value by applying the overdriving to image data that is transmitted to the image data driving apparatus. The image data processing apparatus may compare a previous frame grayscale value and a current frame grayscale value, may modify the current frame grayscale value in accordance with a difference between the two grayscale values, and may transmit, to the image data driving apparatus, image data including the modified grayscale values.

If such overdriving is excessive, however, a phenomenon in which picture quality is further deteriorated may occur. An overcompensation problem in which the luminance of a subpixel becomes higher or lower than the target luminance due to overdriving may occur.

The image data processing apparatus according to an embodiment may adjust an overdriving degree based on a value of a driving variable for driving a display panel in order to prevent the overcompensation of overdriving.

The driving variable for driving a display panel may be a display brightness value (DBV) that adjusts the brightness of the display panel, for example. The image data processing apparatus may decrease the overdriving degree as the DBV becomes higher when applying overdriving to image data.

In order to understand that the overdriving degree is adjusted based on the DBV, a characteristic of a gamma curve needs to be understood.

Figure 5:
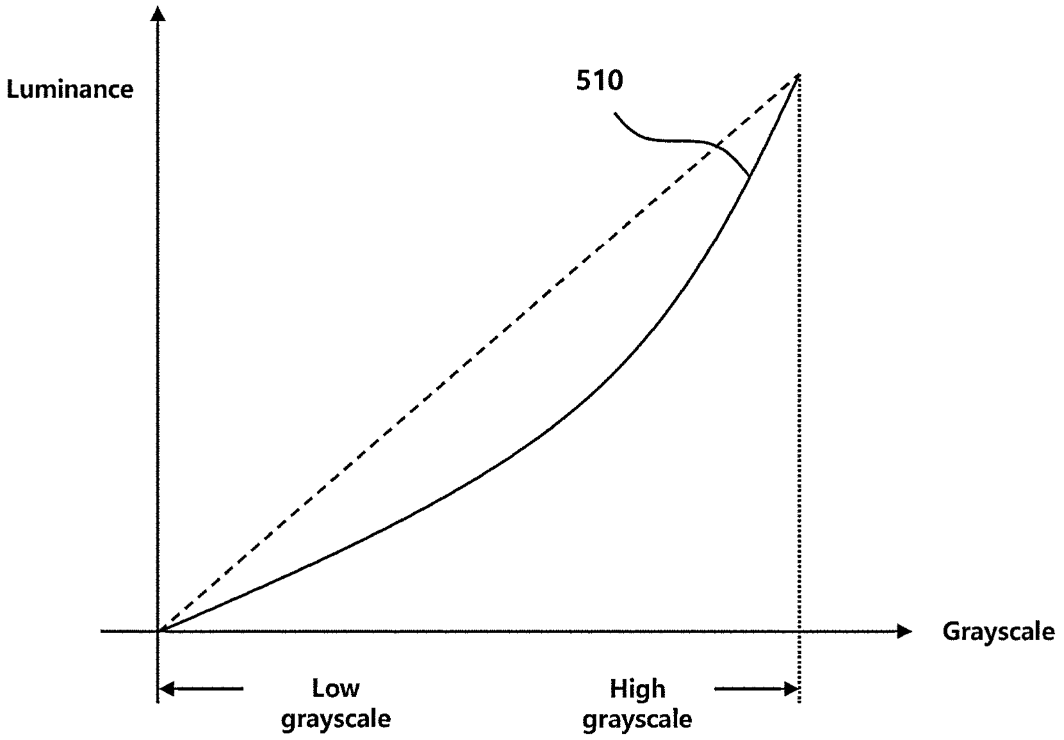
FIG. 5 is a diagram of an example of a gamma curve.

FIG. 5 is a diagram of an example of a gamma curve.

Referring to FIG. 5, a gamma curve 510 may have a characteristic in which high grayscale resolution is formed in a low grayscale area and low grayscale resolution is formed in a high grayscale area.

For example, in the low grayscale area of the gamma curve 510, the amount of luminance that varies in response to a change in 1 grayscale value may be small. In the high grayscale area of the gamma curve 510, the amount of luminance that varies in response to a change in 1 grayscale value may be great.

A person may be sensitive to a low grayscale and may be insensitive to a high grayscale. The gamma curve is results obtained by incorporating such a characteristic of a person.

The image data processing apparatus according to an embodiment may less apply the overdriving when the DBV is high and more apply the overdriving when the DBV is low according to such a principle. In this case, the deterioration of picture quality attributable to overcompensation can be prevented by less applying the overdriving when the sensitivity of a person is decreased because the DBV is high.

Furthermore, for example, the driving variable for driving a display panel may be a frame refresh rate. The image data processing apparatus may decrease the overdriving degree as the frame refresh rate becomes higher when applying the overdriving to image data.

Figure 6:
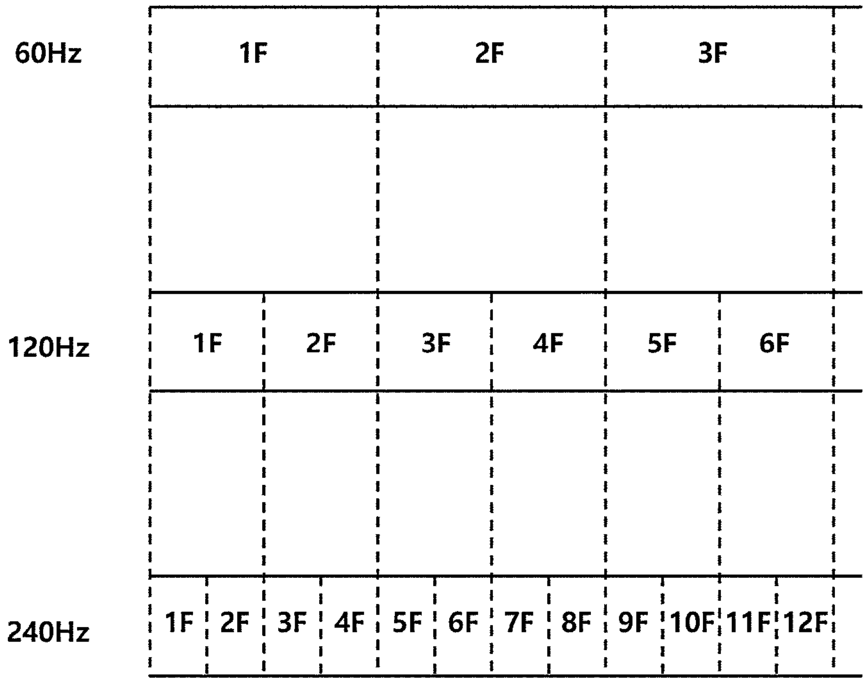
FIG. 6 is a diagram illustrating an example of frame refresh rates.

FIG. 6 is a diagram illustrating an example of frame refresh rates.

Referring to FIG. 6, each frame 1F . . . may be refreshed once per 1/60 second, may be refreshed once per 1/120 second, or may be refreshed once per 1/240, based on a value of the frame refresh rate.

A person's eye has an afterimage effect. Accordingly, although the deterioration of picture quality occurs in a previous frame, if the deterioration problem of picture quality has been solved in a current frame, a person's eye may not severely recognize the problem.

The image data processing apparatus according to an embodiment may less apply the overdriving when a frame refresh rate is high and more apply the overdriving when a frame refresh rate is low according to such a principle. In this case, the deterioration of picture quality attributable to overcompensation can be prevented by less applying the overdriving when the frame refresh rate is high.

Figure 7:
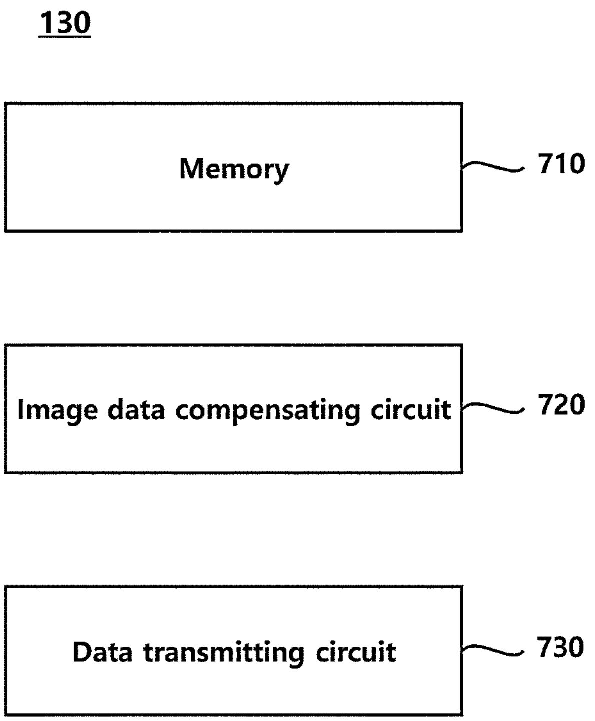
FIG. 7 is a configuration diagram of an image data processing apparatus according to an embodiment.

FIG. 7 is a configuration diagram of an image data processing apparatus according to an embodiment.

Referring to FIG. 7, the image data processing apparatus 130 may include a memory 710, an image data compensating circuit 720, and a data transmitting circuit 730.

The image data processing apparatus 130 may receive image data from an external apparatus, for example, a host every frame. The received image data may be stored in the memory 710. Through such a storage process, the image data processing apparatus 130 may secure previous frame image data and current frame image data. The image data processing apparatus 130 may receive the current frame image data from the external apparatus, and may secure the previous frame image data from the memory 710.

A value of a driving variable for each subpixel may be stored in the memory 710. The driving variable may be a DBV or a frame refresh rate, for example.

The image data processing apparatus 130 may receive a DBV from the host. The host may determine a DBV by recognizing a manipulation of a user, recognizing a state of a program being operated, or surrounding intensity of illumination, and may transmit the DBV to the image data processing apparatus 130. The DBV may have a value of 0 to 100%. A user may increase the DBV if he or she wants to increase the brightness of a display panel and may decrease the DBV if he or she wants to decrease the brightness of the display panel. After receiving the DBV from the host, the image data processing apparatus 130 may store the DBV in the memory 710.

The image data processing apparatus 130 may receive a value of a frame refresh rate from the host. The host may determine a value of the frame refresh rate by recognizing a manipulation of a user or a state of a program being operated, and may transmit the value of the frame refresh rate to the image data processing apparatus 130. As the value of the frame refresh rate becomes higher, the length of a frame time may be shorter and a cycle in which an image is refreshed may be shorter.

The image data processing apparatus 130 may transmit the DBV to the power management apparatus. Furthermore, the power management apparatus may adjust a level of a driving voltage for each subpixel based on the DBV. For example, the power management apparatus may increase a voltage level of the driving voltage as the DBV is increased, and may decrease a voltage level of the driving voltage as the DBV is decreased.

When a voltage level of the driving voltage is increased, the luminance of each subpixel may be increased with respect to the same grayscale value (or the same data voltage). As a result, the entire brightness of a display panel may be increased.

The image data processing apparatus 130 may transmit image data by increasing the transmission speed (or communication speed) of the image data based on a frame refresh rate and adjusting the cycle of a vertical sync signal and/or a horizontal sync signal.

Lookup tables for overdriving may be stored in the memory 710. One of the lookup tables may be selected and used based on a driving variable, and a plurality of lookup tables may be selected in order to apply an interpolation method. For example, when a DBV is 90%, a lookup table corresponding to the corresponding value may be selected. Furthermore, when a DBV is 95%, after a lookup table corresponding to 90% and a lookup table corresponding to 100% are selected, intermediate values of the two lookup tables may be used according to the interpolation method.

An adjusted value as a global variable may be stored in the memory 710.

The utilization of such values stored in the memory 710 is more specifically described below.

The image data compensating circuit 720 may generate overdriving image data by comparing previous frame image data and current frame image data.

The image data compensating circuit 720 may generate an overdriving grayscale value by comparing a previous frame grayscale value and a current frame grayscale value for each subpixel. For example, when a previous frame grayscale value of one subpixel is 100 and a current frame grayscale value thereof is 200, the image data compensating circuit 720 may generate 220 as an overdriving grayscale value. Furthermore, for example, when a previous frame grayscale value of one subpixel is 100 and a current frame grayscale value thereof is 80, the image data compensating circuit 720 may generate 76 as an overdriving grayscale value.

An overdriving degree may be represented as an overdriving gain value or an overdriving offset value. For example, in the example in which the current frame grayscale value is 200, the overdriving gain value may be 1.2, and the overdriving offset value may be 20, the overdriving degree may be represented as an overdriving gain value or an overdriving offset value.

The image data compensating circuit 720 may adjust the overdriving degree based on a driving variable for each subpixel.

The image data compensating circuit 720 may decrease the overdriving degree as a DBV becomes higher. The image data compensating circuit 720 may decrease the overdriving gain value or the overdriving offset value as the DBV becomes higher.

An LED may be disposed in each subpixel of a display panel. Driving power may be supplied from a driving voltage source, for example, the power management apparatus to the LED. In such a structure, a level of the driving voltage outputted by the driving voltage source may be adjusted based on a DBV. The image data compensating circuit may decrease the overdriving degree for each subpixel as a level of the driving voltage becomes higher.

The image data compensating circuit 720 may decrease the overdriving degree as a frame refresh rate becomes higher. The image data compensating circuit 720 may decrease the overdriving gain value or the overdriving offset value as the frame refresh rate becomes higher.

The image data compensating circuit 720 may adjust an overdriving degree for each subpixel based on a location of each subpixel.

The image data compensating circuit 720 may adjust the overdriving degree based on a distance between each subpixel and the image data driving apparatus. The image data compensating circuit 720 may increase the overdriving degree as the distance between each subpixel and the image data driving apparatus becomes distant, and may decrease the overdriving degree as the distance becomes close.

The image data compensating circuit 720 may adjust the overdriving degree based on a distance between each subpixel and a driving voltage source. The image data compensating circuit 720 may increase the overdriving degree as the distance between each subpixel and the driving voltage source becomes distant, and may decrease the overdriving degree as the distance becomes close.

The image data compensating circuit 720 may additionally adjust the overdriving degree based on a location of each subpixel. For example, the image data compensating circuit 720 may generate overdriving image data based on a driving variable for each subpixel. Furthermore, the image data compensating circuit 720 may additionally adjust the overdriving degree based on a location of each subpixel with respect to the generated overdriving image data. In the aforementioned example, the image data compensating circuit 720 may generate the overdriving grayscale value 220 by comparing the previous frame grayscale value 100 and the current frame grayscale value 200 based on a driving variable. Furthermore, the image data compensating circuit 720 may modify the overdriving grayscale value by additionally adjusting the overdriving gain value or the overdriving offset value based on a location of each subpixel.

The image data compensating circuit 720 may use the adjusted value as the global variable in the correction according to the distance. The global variable may be a value that is determined by the distance regardless of a driving variable. In this case, the adjusted value may be a value multiplied by the overdriving gain value or the overdriving offset value.

The image data on which compensation has been processed by the image data compensating circuit 720 may be transmitted from the data transmitting circuit 730 to the image data driving apparatus. If the image data processing apparatus 130 and the image data driving apparatus share the memory 710, the image data processing apparatus 130 may not include the data transmitting circuit 730.

Figure 8:
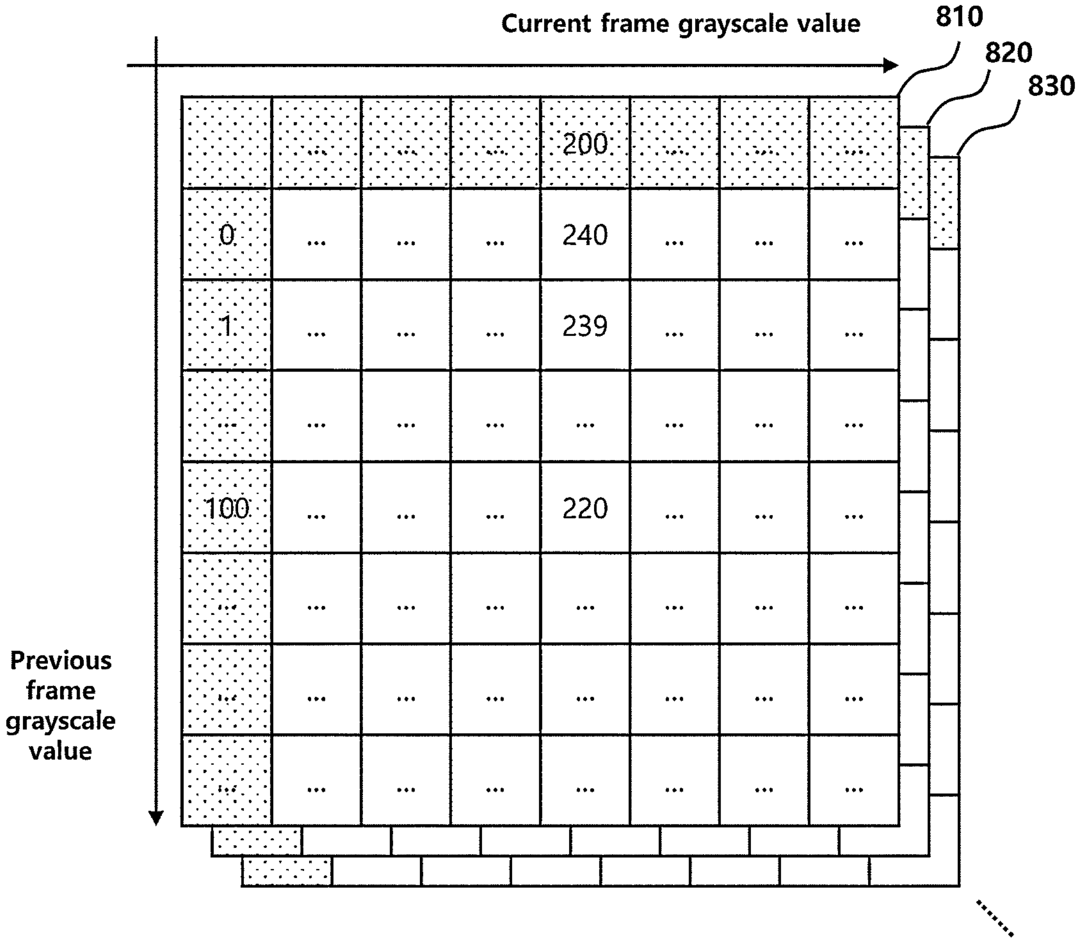
FIG. 8 is a first example diagram conceptually illustrating lookup tables according to DBVs.

FIG. 8 is a first example diagram conceptually illustrating lookup tables according to DBVs.

Referring to FIG. 8, lookup tables 810, 820, and 830 may be stored in the memory for each DBV.

The image data compensating circuit may select one of the lookup tables 810, 820, and 830 based on a DBV, and may calculate an overdriving grayscale value by putting a previous frame grayscale value and a current frame grayscale value into the selected lookup tables 810, 820, and 830. For example, when the DBV is 100%, the image data compensating circuit may select the first lookup table 810 among the lookup tables 810, 820, and 830 stored in the memory. Furthermore, the image data compensating circuit may generate an overdriving grayscale value by putting a previous frame grayscale value and a current frame grayscale value into the first lookup table 810 for each subpixel. When the previous frame grayscale value is 100 and the current frame grayscale value is 200, the overdriving grayscale value may be 220.

Values stored in the lookup tables may be values which enable an overdriving degree to be adjusted based on a driving variable.

Figure 9:
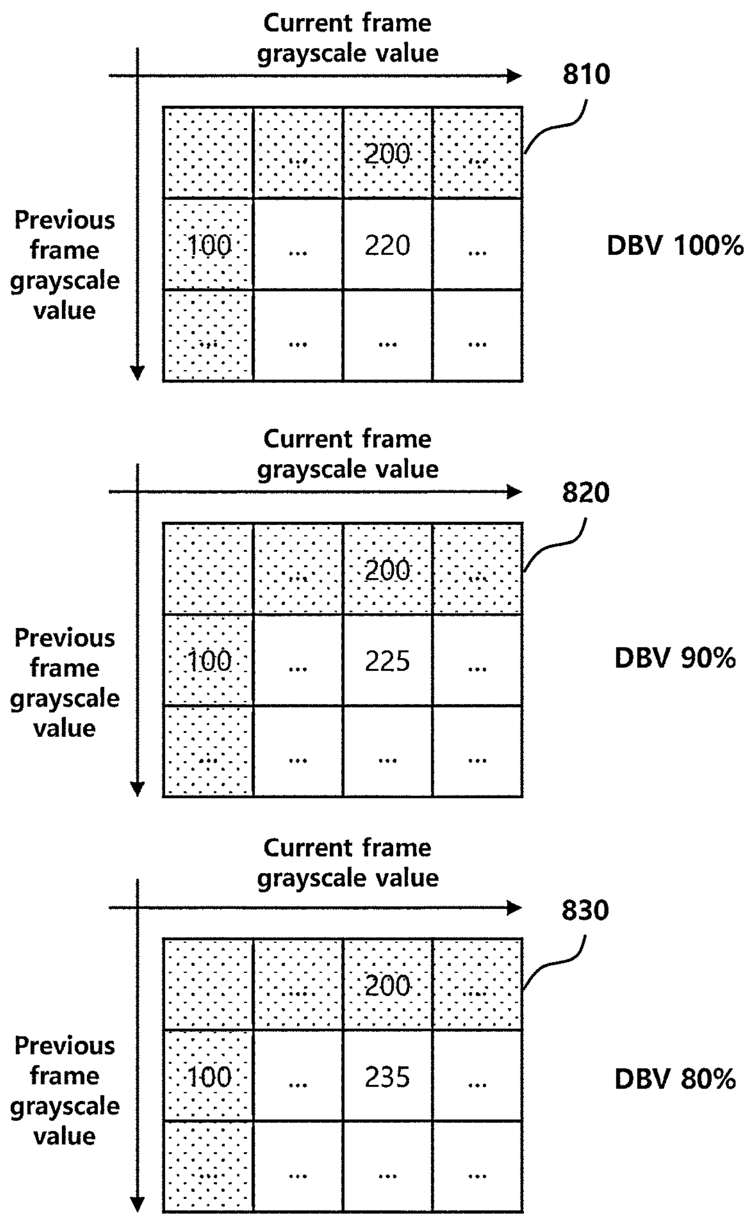
FIG. 9 is an example diagram of lookup tables in which overdriving degrees are stored in a way to be adjusted based on DBVs.

FIG. 9 is an example diagram of lookup tables in which overdriving degrees are stored in a way to be adjusted based on DBVs.

Referring to FIG. 9, the first lookup table 810 may be a lookup table when a DBV is 100%. The second lookup table 820 may be a lookup table when a DBV is 90%. The third lookup table 830 may be a lookup table when a DBV is 80%.

The image data compensating circuit may select a lookup table based on a DBV. For example, the image data compensating circuit may select the first lookup table 810 when the DBV is 100%, may select the second lookup table 820 when the DBV is 90%, and may select the third lookup table 830 when the DBV is 80%.

From values of the lookup tables, it may be seen that an overdriving gain value or an overdriving offset value is decreased as the DBV becomes higher and the overdriving gain value or the overdriving offset value is increased as the DBV becomes lower.

The image data compensating circuit may adjust an overdriving degree based on a DBV by using such lookup tables.

An example in which a driving variable is a DBV has been described with reference to FIGS. 8 and 9. The same method may be applied to a case where the driving variable is a frame refresh rate.

The image data compensating circuit may decrease the overdriving degree as the frame refresh rate becomes higher and increase the overdriving degree as the frame refresh rate becomes lower, by using a lookup table that is stored for each frame refresh rate.

The image data compensating circuit may generate overdriving image data based on one lookup table that is selected among lookup tables based on a predetermined frame refresh rate or may generate overdriving image data based on two lookup tables that are selected among lookup tables by using an interpolation method.

Figure 10:
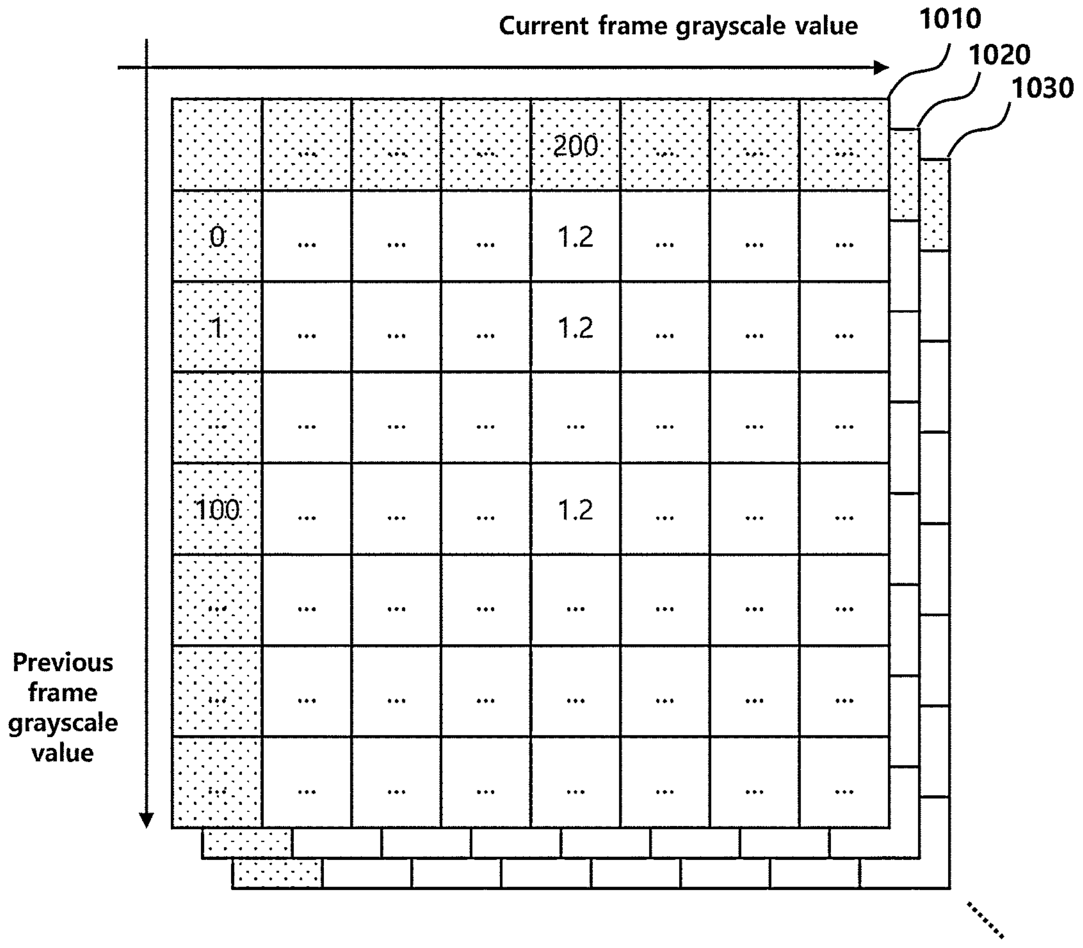
FIG. 10 is a second example diagram conceptually illustrating lookup tables stored in a memory.

FIG. 10 is a second example diagram conceptually illustrating lookup tables stored in the memory.

Referring to FIG. 10, overdriving gain values not overdriving grayscale values may be stored in lookup tables 1010, 1020, and 1030.

The image data compensating circuit may select one lookup table among the lookup tables 1010, 1020, and 1030 based on a driving variable, and may calculate an overdriving gain value by putting a previous frame grayscale value and a current frame grayscale value into the selected lookup tables 1010, 1020, and 1030.

Furthermore, the image data compensating circuit may generate an overdriving grayscale value by adding, to a current frame grayscale value (e.g., 200), an overdriving offset value (e.g., 120) generated by multiplying a difference value (e.g., 100) between the current frame grayscale value (e.g., 200) and a previous frame grayscale value (e.g., 100) by the overdriving gain value.

Although not illustrated in the drawing, overdriving offset values may be stored in the lookup tables.

The image data compensating circuit may select one lookup table among lookup tables based on a driving variable, and may calculate an overdriving offset value by putting a previous frame grayscale value and a current frame grayscale value into the selected lookup tables.

Furthermore, the image data compensating circuit may generate an overdriving grayscale value by adding the overdriving offset value to the current frame grayscale value.

Furthermore, the image data compensating circuit may generate overdriving image data by including all of overdriving grayscale values generated for each subpixel.

The image data compensating circuit may additionally compensate for the overdriving grayscale value based on a location of each subpixel. In this case, the image data compensating circuit may use an adjusted value as a global variable.

Figure 11:
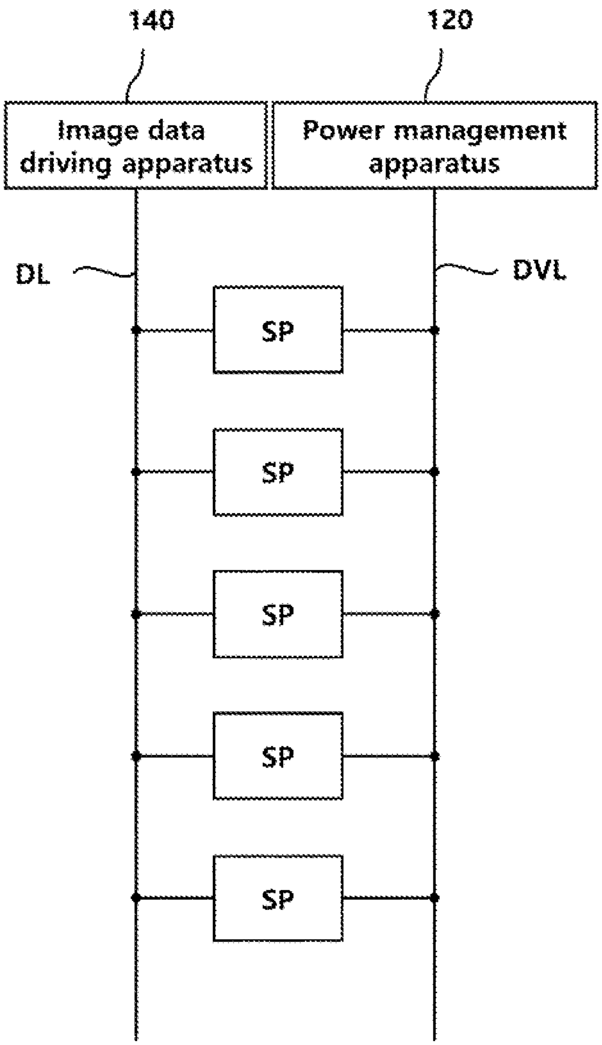
FIG. 11 is a diagram illustrating a relation between the locations of subpixels, a data line, and a driving voltage line.

FIG. 11 is a diagram illustrating a relation between the locations of subpixels, the data line, and the driving voltage line.

Referring to FIG. 11, multiple subpixels SP may be connected to one data line DL. Furthermore, the multiple subpixels SP may be connected to one driving voltage line DVL.

Driving environments in which the subpixels SP are located may be different from one another due to line impedance of the data line DL and the driving voltage line DVL.

The image data compensating circuit may additionally compensate for an overdriving grayscale value in order to compensate for a difference such driving environments.

The image data compensating circuit may decrease an overdriving degree for the subpixel SP as a distance between the image data driving apparatus and the subpixel SP becomes close, and may increase the overdriving degree for the subpixel SP as the distance becomes distant. For example, the image data compensating circuit may decrease a calculated overdriving gain value based on a driving variable when the distance is close, and may increase a calculated overdriving gain value based on a driving variable when the distance is distant.

The image data compensating circuit may decrease an overdriving degree for the subpixel SP as a distance between the power management apparatus and the subpixel SP becomes close, and may increase the overdriving degree for the subpixel SP as the distance becomes distant. For example, the image data compensating circuit may decrease a calculated overdriving gain value based on a driving variable when the distance is close, and may increase a calculated overdriving gain value based on a driving variable when the distance is distant.

If the image data driving apparatus and the power management apparatus are disposed at similar locations, the image data compensating circuit may consider only the distance between the subpixel SP and one of the image data driving apparatus and the power management apparatus.

The image data processing apparatus may store an adjusted value in the memory for each distance as a global variable. Furthermore, the image data compensating circuit may select an adjusted value by considering only the distance of each subpixel SP regardless of a driving variable, and may adjust an overdriving gain value or offset value.

Figure 12:
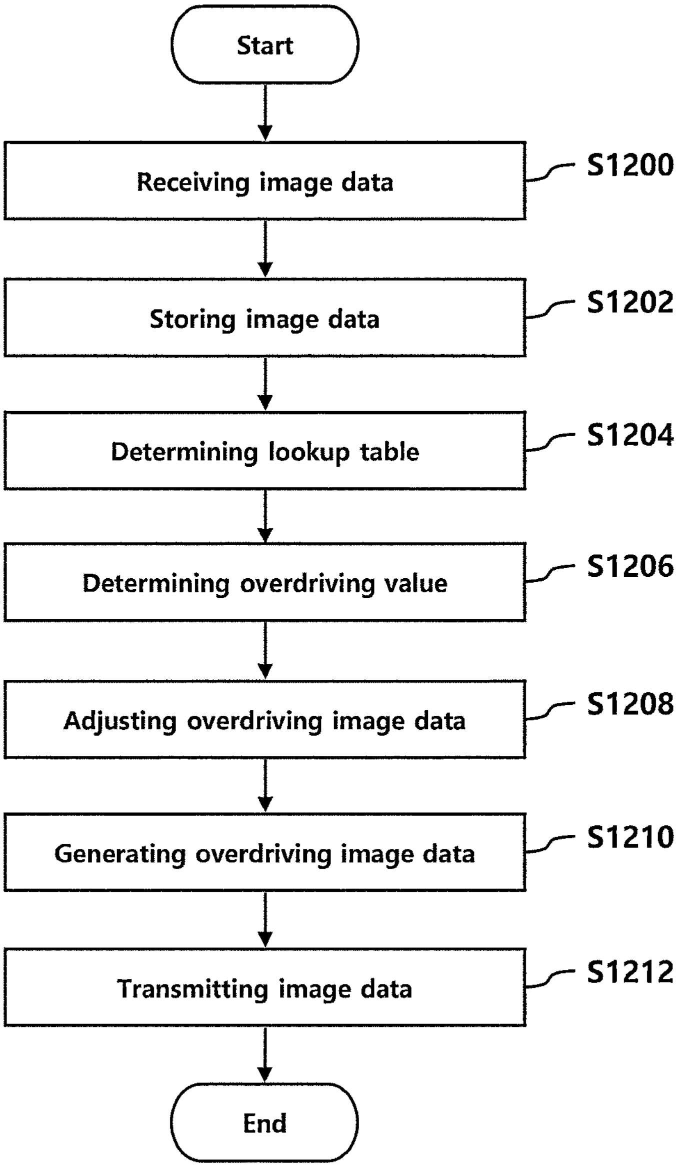
FIG. 12 is a flowchart of an image data processing method according to an embodiment.

FIG. 12 is a flowchart of an image data processing method according to an embodiment.

Referring to FIG. 12, the image data processing apparatus may receive image data from an external apparatus (S1200).

Furthermore, the image data processing apparatus may store the image data in the memory (S1202). The image data processing apparatus may use currently received image data as a current frame image data, and may use, as previous frame image data, image data stored in the memory in a previous frame.

The image data processing apparatus may check a value of a driving variable for driving the display panel, and may determine an overdriving lookup table based on the value of the driving variable (S1204).

The image data processing apparatus may determine the overdriving lookup table for each type of each subpixel.

The image data processing apparatus may determine one overdriving lookup table to be used among pre-stored lookup tables or may determine one overdriving lookup table by combining two or more lookup tables based on an interpolation method.

When the overdriving lookup table is determined, an overdriving lookup table having a lower overdriving value as a frame refresh rate becomes higher with respect to the same grayscale value may be determined.

Alternatively, when the overdriving lookup table is determined, an overdriving lookup table having a lower overdriving value as a level of a driving voltage becomes higher with respect to the same grayscale value may be determined.

Furthermore, the image data processing apparatus may determine an overdriving value for current frame image data by applying, to the overdriving lookup table, previous frame image data and the current frame image data stored in the memory (S1206). The overdriving value may be an overdriving gain value or an overdriving offset value, for example.

If the overdriving value is the overdriving gain value, the image data processing apparatus may calculate a difference value between a current frame grayscale value and previous frame grayscale value of each subpixel, and may generate an overdriving grayscale value by multiplying the difference value by the overdriving gain value and then adding the multiplied result to the current frame grayscale value. Furthermore, the image data processing apparatus may generate overdriving image data including all of the overdriving grayscale values for each subpixel (S1210).

The image data processing apparatus may generate the overdriving image data (S1210) after adjusting the overdriving value based on an adjusted value that is determined for each location of each subpixel (S1208). For example, the image data processing apparatus may generate a corrected overdriving value by multiplying an overdriving value by an adjusted value for each location of each subpixel. Furthermore, the image data processing apparatus may calculate overdriving grayscale values for the subpixel based on the corrected overdriving value, and may generate overdriving image data by using the calculated overdriving grayscale values.

An embodiment has been described above. According to such an embodiment, picture quality can be improved through the processing of image data.

What is claimed is:

1. An image data processing apparatus comprising:
a memory to store previous frame image data; and
an image data compensating circuit configured to:
compare grayscale information of a previous frame and grayscale information of a current frame, and
generate overdriving image data based on the comparison, wherein an overdriving degree is adjusted based on a display brightness value (DBV) for adjusting brightness of a display panel,
wherein the image data compensating circuit is configured to decrease_the overdriving degree as a level of a driving voltage supplied to a light-emitting diode (LED) becomes higher.

2. The image data processing apparatus of claim 1, wherein the LED is disposed in each subpixel of the display panel.

3. The image data processing apparatus of claim 2, wherein:
driving power is supplied from a driving voltage source to the LED, and
wherein the level of the driving voltage outputted from the driving voltage source is adjusted based on the DBV.

4. The image data processing apparatus of claim 3, wherein the image data compensating circuit is configured to generate the overdriving image data by calculating an overdriving gain value or an overdriving offset value based on a comparison between the grayscale information of the previous frame and the grayscale information of the current frame of each subpixel, wherein the overdriving gain value or the overdriving offset value decreases as the level of the driving voltage becomes higher.

5. An image data processing apparatus comprising:
a memory configured to store previous frame image data; and
an image data compensating circuit configured to:
compare greyscale information of a current frame and grayscale information of a previous frame image, and
generate overdriving image data based on the comparison, wherein an overdriving degree is adjusted based on a driving variable for each subpixel,
wherein the image data compensating circuit is configured to adjust the overdriving degree according to a frame refresh rate, and
the overdriving degree and the frame refresh rate are inversely correlated.

6. The image data processing apparatus of claim 5, further comprising a data transmitting circuit configured to transmit the overdriving image data to an image data driving apparatus for driving a display panel in which self-light emitting elements are disposed.

7. The image data processing apparatus of claim 6, wherein:
a driving transistor for adjusting an amount of driving power supplied to a self-light emitting element is disposed in each subpixel of the display panel, wherein the amount of the driving power is adjusted based on a data voltage supplied from the image data driving apparatus to the driving transistor.

8. The image data processing apparatus of claim 7, wherein:
the driving power is supplied from a driving voltage source that supplies a driving voltage,
a level of the driving voltage is adjusted based on a display brightness value (DBV), which is used for adjusting brightness of the display panel, and
the image data compensating circuit is configured to decrease the overdriving degree as the level of the driving voltage becomes higher.

9. The image data processing apparatus of claim 7, wherein:
the driving power is supplied from a driving voltage source that supplies a driving voltage, and
the image data compensating circuit is configured to additionally adjust the overdriving degree for a corresponding subpixel based on a distance between the driving voltage source and a subpixel.

10. The image data processing apparatus of claim 9, wherein the image data compensating circuit is configured to decrease the overdriving degree for a corresponding subpixel as the distance between the driving voltage source and the subpixel decreases.

11. The image data processing apparatus of claim 5, wherein the image data compensating circuit is configured to decrease the overdriving degree as the frame refresh rate becomes higher.

12. The image data processing apparatus of claim 11, wherein:
the memory stores lookup tables for respective frame refresh rates, and
the image data compensating circuit is configured to generate the overdriving image data based on one lookup table selected among the lookup tables based on a predetermined frame refresh rate or to generate the overdriving image data based on two lookup tables selected among the lookup tables by using an interpolation method.

13. An image data processing method comprising:
receiving current frame image data and storing the current frame image data in a memory;
checking a value of a driving variable for driving a display panel and determining an overdriving lookup table based on the value of the driving variable;
determining an overdriving value for the current frame image data by applying, to the overdriving lookup table, previous frame image data and the current frame image data stored in the memory; and compensating for the current frame image data by using the overdriving value, wherein, in determining the overdriving lookup table, the overdriving lookup table having a low overdriving value as a frame refresh rate becomes higher with respect to an identical grayscale value is determined.

14. The image data processing method of claim 13, wherein the overdriving lookup table is determined for a type of each subpixel.

15. The image data processing method of claim 13, further comprising adjusting the overdriving value based on an adjusted value determined based on a location of each subpixel before compensating for the current frame image data.

16. The image data processing method of claim 13, further comprising transmitting image data, to which the overdriving value has been applied, to an image data driving apparatus for driving the display panel comprising subpixels, in each of which a self-light emitting element is disposed.

17. The image data processing method of claim 16, wherein:

a driving transistor for adjusting an amount of driving power supplied to the self-light emitting element is disposed in each subpixel of the display panel, wherein the amount of the driving power is adjusted based on a data voltage supplied from the image data driving apparatus to the driving transistor.

18. The image data processing method of claim 17, wherein:

the driving power is supplied from a driving voltage source for supplying a driving voltage, a level of the driving voltage is adjusted based on a display brightness value (DBV) for adjusting a brightness of the display panel, and wherein the overdriving value is based on a difference between the grayscale information of the previous frame and the grayscale information of the current frame.

19. The image data processing method of claim 13, wherein, in determining the overdriving lookup table, the overdriving lookup table is determined among pre-stored lookup tables or by combining two or more lookup tables based on an interpolation method.

* * * * *